(12) United States Patent
Liu et al.

(10) Patent No.: US 9,742,589 B2
(45) Date of Patent: Aug. 22, 2017

(54) TECHNIQUES FOR REALIZING SERVICE CHAINING

(71) Applicant: International Business Machines Corporation, Armonk, NY (US)

(72) Inventors: Tian Cheng Liu, Beijing (CN); Baohua Yang, Beijing (CN); Yue Zhang, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/697,986

(22) Filed: Apr. 28, 2015

(65) Prior Publication Data
US 2015/0319089 A1 Nov. 5, 2015

(30) Foreign Application Priority Data
Apr. 30, 2014 (CN) .......................... 2014 1 0181399

(51) Int. Cl.
| | |
|---|---|
| *H04L 12/64* | (2006.01) |
| *H04L 12/741* | (2013.01) |
| *H04L 29/06* | (2006.01) |
| *H04L 12/721* | (2013.01) |
| *H04L 29/08* | (2006.01) |

(52) U.S. Cl.
CPC ........ *H04L 12/6418* (2013.01); *H04L 45/127* (2013.01); *H04L 45/566* (2013.01); *H04L 45/745* (2013.01); *H04L 67/327* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2011/0299537 A1* | 12/2011 | Saraiya | ............... H04L 61/2596 370/392 |
| 2013/0003735 A1 | 1/2013 | Chao et al. | |
| 2013/0272305 A1* | 10/2013 | Lefebvre | ................. H04L 47/24 370/392 |
| 2013/0332983 A1 | 12/2013 | Koorevaar et al. | |

(Continued)

FOREIGN PATENT DOCUMENTS

WO    2013156931 A1    10/2013

OTHER PUBLICATIONS

Dunbar et al.,"Layer 4-7 Service Chain problem statement", Jul. 11, 2013, <http://tools.ietf.org/html/draft-dunbar-l4-l7-sc-problem-statement-00>.

(Continued)

*Primary Examiner* — Paul H Masur
*Assistant Examiner* — Michael Phillips
(74) *Attorney, Agent, or Firm* — David B. Woycechowsky (57) ABSTRACT

Techniques for realizing service chaining, a corresponding apparatus and an SDN (Software Defined Network) controller are disclosed. The method includes temporarily modifying an original destination MAC (media access control) address of a packet and an original source MAC address the packet during the time the packet makes a hop from one middlebox to another. A restore operation is used to restore the original source and destination MAC addresses after the hop is made.

7 Claims, 6 Drawing Sheets

(56) References Cited

U.S. PATENT DOCUMENTS

2015/0341258 A1* 11/2015 Itoh .................. H04L 45/38
370/389
2016/0099874 A1* 4/2016 Hu .................. H04L 12/6418
370/236

OTHER PUBLICATIONS

Joseph et al., "A Policy-aware Switching Layer for Data Centers", SIGCOMM'08, Aug. 17-22, 2008, Seattle, Washington, USA, Copyright 2008 ACM 978-1-60558-175-0/08/08, pp. 51-62.
Qazi et al., "SIMPLE-fying Middlebox Policy Enforcement Using SDN", SIGCOMM'13, Aug. 12-16, 2013, Hong Kong, China, Copyright 2013 ACM 978-1-4503-2056-6/13/08, 12 pages.
China Patent Application No. 201410181399.8 entitled "Method and Apparatus for Realizing Service Chaining", filed Apr. 30, 2014.
"Cloud Security Market—Global Industry Analysis, Size, Share, Growth, Trends and Forecast 2014—2020", provided by inventor in main idea of disclosure dated Aug. 29, 2013, 3 pages, <http://www.transparencymarketresearch.com/cloud-security-market.html#sthash.EhZMhWJb.dpuf>.
"Neutron", Wiki, provided by inventor in main idea of disclosure dated Aug. 29, 2013, 11 pages, <https://wiki.openstack.org/wiki/Neutron>.

* cited by examiner

TECHNIQUES FOR REALIZING SERVICE CHAINING

CROSS-REFERENCE TO RELATED APPLICATIONS

This application claims priority under 35 U.S.C. section 119, and any other applicable U.S. law, from Chinese Patent Application No. 2014-10181399.8 filed Apr. 30, 2014, the entire contents of which are hereby incorporated by reference.

BACKGROUND

The present invention relates to the field of to an SDN (Software Defined Network) based service chaining, and more particularly to realization of such chaining.

With the increasing popularity of cloud computing in recent years, cloud security, especially network security, has been attempted to be addressed by conventional systems and methods. One type of known method and system involves the use of SDN-based service chaining to dynamically provide virtualized network security services.

SDN is emerging known computer network technology, which decouples the system that makes the decision as to where to send the traffic (called a control plane) from the underlying system that forwards the traffic to a selected destination (called a data plane). The control plane typically includes an SDN controller, and the data plane typically includes a set of interconnected switches. The control plane uses a communication mechanism, such as OpenFlow, to communicate with the data plane.

In conventional SDN systems, a "service chain" refers to a chain formed of a group of services, that is, an ordered set of services. These services may be called middleboxes, which may perform various operations such as conversion, check, filtering on a flow, so as to provide network security functions such as firewall. The middleboxes are usually physically connected with one another via a group of switches. A service chain provides constrained point-to-point forwarding service, wherein a flow from a specific source to a specific destination must pass through a Layer 2 (L2) path formed by a given set of middleboxes in a given order.

SUMMARY

According to an aspect of the present invention, there is a method, computer program product and/or system that performs the following operations (not necessarily in the following order): (i) receiving a packet belonging to a service chain, which packet: (a) includes an original destination MAC (media access control) address, (b) includes an original source MAC address, and (c) is to be sent to a switch in a next hop, including a middlebox, in the service chain; (ii) in response to receipt of the packet, modifying the original destination MAC address of the packet into a modified destination MAC address corresponding to the middlebox in the next hop in the service chain; (iii) in response to receipt of the packet, modifying the original source MAC address of the packet into a modified source MAC address corresponding to code data encoded with state information of the packet; (iv) sending the packet to the middlebox in the next hop in the service chain; (v) receiving the packet at the next hop in the service chain so that the next hop becomes a current hop in the service chain; (vi) in response to receipt of the packet at the current hop of the service chain, restoring the modified destination MAC address of the packet to the original destination MAC address of the packet; and (vii) in response to receipt of the packet at the current hop of the service chain, restoring the modified source MAC address of the packet to the original source MAC address of the packet.

According to a further aspect of the present invention, an apparatus includes: (i) a first module configured to, in response to receiving a packet at a switch, look up a matching rule in a forward table according to the source MAC (media access control) address, the destination MAC address and the receive port of the packet, with each rule in the forward table designating: (a) a mapping between the source MAC address, the destination MAC address and the receive port of the packet, (b) a modify operation to be performed on the source MAC address and the destination MAC address of the packet, (c) a restore operation to be performed on the source MAC address and the destination MAC address of the packet, and (d) a forward port of the packet; (ii) a second module configured to, in response to finding the matching rule in the forward table, perform the modify/restore operation designated in the matching rule on the source MAC address and destination MAC address of the packet; and (iii) a third module configured to forward the packet through the forward port designated in the matching rule. The modify operation includes the following sub-operations: modifying the original destination MAC address of the packet into a modified destination MAC address of the middlebox in the next hop in the service chain, and modifying the original source MAC address of the packet into a modified source MAC address corresponding to code data encoded the state information of the packet. The restore operation includes the following sub-operations: restoring the modified destination MAC address of the packet to the original destination MAC address of the packet, and restoring the modified source MAC address of the packet to the original source MAC address of the packet.

According to a further aspect of the present invention, an SDN controller includes: (i) a middlebox manager configured to manage middleboxes and fake MAC (media access control) addresses of the middleboxes; (ii) a service chain manager configured to manage service chains by maintaining a service chain table, the service chain table including the mapping between service chain identification and a middlebox list of the service chain; (iii) a session manager configured to manage sessions by maintaining a session table, the session table including the mapping between the session identification, the service chain identification, the original destination MAC address and the original source MAC address of a packet; (iv) a packet processing module. The packet processing module is configured to, in response to receiving a packet from a switch: (a) determine the service chain and the session to which the packet belongs and the current position of the packet in the service chain according to the source MAC address and the destination MAC address of the packet and the session table and the service chain table, so as to determine any modify operation and/or any restore operation to be performed on the source MAC address and the destination MAC address of the packet and the forward port of the packet, (b) form a rule comprising the mapping between the source MAC address, the destination MAC address, the receive port of the packet, and the modify or restore operation to be performed on the source MAC address and the destination MAC address of the packet and the forward port, (c) perform the determined modify and/or restore operation on the source MAC address and the destination MAC address of the packet, and forward the packet through the determined forward port, and (d) send the formed rule to the switch to be stored by the switch in a forward table for use in processing and forwarding of subsequent packets. The modify operation includes the following sub-operations: (i) modifying the original destination MAC address of the packet into a designated MAC address of the middlebox in the next hop in the service chain, and (ii) modifying the original source MAC address of the packet into code data encoded with state information of the packet. The restore operation includes the following sub-operations: (i) restoring the modified destination MAC address of the packet to the original destination MAC address of the packet, and (ii) restoring the source MAC address of the packet to the original source MAC address of the packet.

BRIEF DESCRIPTION OF THE DRAWINGS

Through the more detailed description of some embodiments of the present disclosure in conjunction with the accompanying drawings, the above and other objects, features and advantages of the present disclosure will become more apparent, wherein the same reference numerals generally refer to the same components in the embodiments of the present disclosure.

DETAILED DESCRIPTION

Some embodiments of the present invention may recognize and/or address one, or more, of the following SDN-based service chaining technology challenges: (i) the middleboxes may be at any position in the network, or even may be migrated dynamically; (ii) the middleboxes are difficult to be addressed, since many middleboxes behave like black holes, and they do not respond to any listening or probe; (iii) the traditional Layer 2 (Ethernet) forwarding is stateless, with the forwarding being merely according to the destination MAC address (for example, if neither of middleboxes A and B has a MAC address, it is difficult to know that B should be accessed after A is accessed); (iv) in conventional SDN systems a data packet received by a middlebox is not the original data packet, and thus special middlebox hardware or software is required; (vi) the problem of how to deal with middleboxes not supporting MAC addresses; (vii) in conventional systems, a re-entry problem may occur when a plurality of middleboxes are connected to one switch; (viii) difficulties associated with using private protocols; (ix) insufficient performance; and/or (x) maximum transfer unit (MTU) is too large.

Some embodiments of the present invention may provide an improved realization scheme of SDN-based service chaining.

In an aspect of the present invention, there is provided a method for realizing service chaining, including the following steps (not necessarily in the following order): (i) a modifying step of, in response to receiving a packet belonging to a service chain and that the packet is to be sent to a switch in the next hop in the service chain, modifying the original destination MAC address of the packet into a designated MAC address of the middlebox in the next hop in the service chain, and modifying the original source MAC address of the packet into code data encoded with state information of the packet; and (ii) a restoring step of, in response to that the packet is to be sent to the middlebox in the current hop in the service chain, restoring the modified destination MAC address of the packet to the original destination MAC address, and restoring the modified source MAC address of the packet to the original source MAC address of the packet.

In another aspect of the present invention, there is provided a method for realizing service chaining, including the following steps (not necessarily in the following order): (i) in response to receiving a packet at a switch, looking up a matching rule in a forward table according to the source MAC address, the destination MAC address and the receive port of the packet, wherein a rule in the forward table designates the mapping between the source MAC address, the destination MAC address and the receive port of the packet, and a modify or restore operation to be performed on the source MAC address and the destination MAC address of the packet and the forward port of the packet; (ii) in response to finding a matching rule in the forward table, performing the modify or restore operation designated in the matching rule on the source MAC address and the destination MAC address of the packet, and forwarding the packet through the forward port designated in the matching rule. The modify operation includes the following steps (not necessarily in the following order): (a) modifying the original destination MAC address of the packet into a designated MAC address of the middlebox in the next hop in the service chain, and (b) modifying the original source MAC address of the packet into code data encoded with state information of the packet. The restore operation includes the following sub-steps (not necessarily in the following order): (a) restoring the modified destination MAC address of the packet to the original destination MAC address of the packet, and (b) restoring the modified source MAC address of the packet to the original source MAC address of the packet.

In yet another aspect of the present invention, there is provided an apparatus for realizing service chaining, the apparatus including modifying means, and a restoring means. The modifying means is configured to, in response to receiving a packet belonging to a service chain and that the packet is to be sent to a switch in the next hop in the service chain, modify the original destination MAC address of the packet into a designated MAC address of the middlebox in the next hop in the service chain, and modify the original source MAC address of the packet into code data encoded with state information of the packet. The restoring means is configured to, in response to that the packet is to be sent to the middlebox in the current hop in the service chain, restore the modified destination MAC address of the packet to the original destination MAC address of the packet, and restore the modified source MAC address of the packet to the original source MAC address of the packet.

In a further aspect of the present invention, there is provided an apparatus for realizing service chaining, the apparatus including a first means and a second means. The first means is configured to, in response to receiving a packet at a switch, look up a matching rule according to the source MAC address, the destination MAC address and the receive port of the packet, wherein a rule in the forward table designates the mapping between the source MAC address, the destination MAC address and the receive port of the packet, and the modify or restore operation to be performed on the source MAC address and the destination MAC address of the packet and the forward port of the packet. The second means is configured to, in response to finding a matching rule in the forward table, perform the modify or restore operation designated in the matching rule on the source MAC address and destination MAC address of the packet, and forward the packet through the forward port designated in the matching rule. The modify operation includes the following steps (not necessarily in the following order): (i) modifying the original destination MAC address of the packet into a designated MAC address of the middlebox in the next hop in the service chain, and (ii) modifying the original source MAC address of the packet into code data encoded with state information of the packet. The restore operation includes the following steps (not necessarily in the following order): (i) restoring the modified destination MAC address of the packet to the original destination MAC address of the packet, and (ii) restoring the modified source MAC address of the packet to the original source MAC address of the packet.

In still a further aspect of the present invention, there is provided an SDN controller including: (i) a middlebox manager configured to manage middleboxes and their fake MAC addresses; a service chain manager configured to manage service chains by maintaining a service chain table, the service chain table comprising the mapping between service chain identification and the middlebox list of the service chain; (ii) a session manager configured to manage sessions by maintaining a session table, the session table including the mapping between session identification, service chain identification, the original destination MAC address and the original source MAC address of a packet; (iii) a packet processing module configured to, in response to receiving a packet from a switch, determine the service chain and the session to which the packet belongs and the current position of the packet in the service chain according to the source MAC address and the destination MAC address of the packet and the session table and the service chain table, so as to determine the modify or restore operation to be performed on the source MAC address and the destination MAC address of the packet and the forward port of the packet, and to form a rule comprising the mapping between the source MAC address, the destination MAC address, the receive port of the packet, and the modify or restore operation to be performed on the source MAC address and the destination MAC address of the packet and the forward port; perform the determined modify or restore operation on the source MAC address and the destination MAC address of the packet, and forward the packet through the determined forward port; (iv) a sending module configured to send the formed rule to the switch to be stored by the switch in a forward table for use in processing and forwarding of subsequent packets. The modify operation includes the following steps (not necessarily in the following order): (a) modifying the original destination MAC address of the packet into a designated MAC address of the middlebox in the next hop in the service chain, and (b) modifying the original source MAC address of the packet into code data encoded with state information of the packet. The restore operation includes the following steps (not necessarily in the following order): (a) restoring the modified destination MAC address of the packet to the original destination MAC address of the packet, and (b) restoring the source MAC address of the packet to the original source MAC address of the packet.

Advantages of various embodiments of the present invention may include one, or more, of the following: (i) the traffic seen by the hosts and the middleboxes will keep the original format without changes, therefore service provision is transparent to both tenants and middleboxes, and thus does not affect the existing network forwarding; (ii) the forward rules on the switches are generated by the SDN controller, without need to make any change to the switch hardware, and thus the deployment of the service chain is easy and flexible; (iii) the SDN switch may be easily integrated into an existing network infrastructure, and it can even work with non-SDN switches; (iv) in addition, the forward rules may be dynamically updated by the SDN controller; (v) the service chain is easy to manage; and/or (vi) provides flexible performance and security support.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Some embodiments of the present invention are based on the requirements or assumptions respectively discussed in the following paragraphs.

FIRST REQUIREMENT/ASSUMPTION: Middleboxes are treated as Layer 2 appliances, which act as black holes (that is, never responding to any request/probe/scan), and they includes firewalls (FW), intrusion prevention/detection systems (IPS), data leakage prevention systems (DLP), etc.

SECOND REQUIREMENT/ASSUMPTION: Middleboxes are "placed" inline of specific traffic: the relevant traffic passes through the middleboxes in a predefined order before reaching the destination.

THIRD REQUIREMENT/ASSUMPTION: Each middlebox itself is L2-transparent, and behaves similarly to a wire (an on-off switch), that is, it has two interfaces, and "moves" (cleans) traffic from one interface to the other interface.

FOURTH REQUIREMENT/ASSUMPTION: Different service chains may share middlebox.

FIFTH REQUIREMENT/ASSUMPTION: Middleboxes may be placed in any position in the Layer 2 network.

SIXTH REQUIREMENT/ASSUMPTION: A bi-directional chain may be implemented as two unidirectional chains, and thus here only unidirectional chains are considered.

Some embodiments of the present invention include encoding the destination MAC address and the source MAC address of a packet when transmitting the packet between hops of a service chain, and decoding at each hop. Here, a hop may be considered as a middlebox in the service chain and the switch to which it is connected.

Specifically, when a packet is transmitted to the next hop in the service chain, the destination MAC address of the packet will be modified as the fake MAC address of the middlebox in the next hop. Similarly to the IP forwarding mechanism, each middlebox will be assigned a fake MAC address; the fake MAC address functions similarly to a real MAC address, that is, for addressing the middlebox.

In addition, the source MAC address of the packet will be modified into a code word carrying the state of the packet in the service chain. Because the source MAC address of the packet is rarely used for forwarding, modifying the source MAC address has little impact on the forwarding mechanism (of either a SDN network or a traditional network). Modifying the source MAC address of the packet appropriately may also avoid "misleading" the source learning mechanism: when the packet including the source MAC address passes through a path in a "use-defined chain", the topology learning mechanism may get a wrong adjacent matrix. The modified code word may comprise the ID of the session to which the packet belongs (which is used to retrieve the original MAC address between the hops), and state information of the packet in the service chain (for example, the current position of the packet in the chaining). In addition, the code word may further include a code word indicator at the front of the code word, for indicating that the field is not an ordinary MAC address, but a code word according to the present invention. The code word indicator may belong to the range of reserved MAC addresses, so as to be distinguished from ordinary MAC addresses.

In some embodiments, at the switch of each hop, before the packet is transmitted to the middlebox, it should be ensured that the packet header is restored to the original packet header (comprising the original destination MAC address and the original source MAC address).

Figure 1:
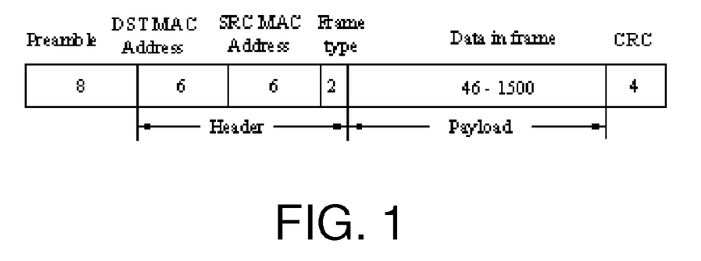
FIG. 1 shows the structure of a Layer 2 packet.

FIG. 1 shows a structure of an L2 packet. As shown, each L2 packet is formed by an 8-byte preamble, 14-byte header, 46-1500-byte payload and 4-byte cyclic redundancy check (CRC), wherein the packet header comprises a 6-byte destination MAC address, 6-byte source MAC address and 2-byte frame type.

Figure 2:
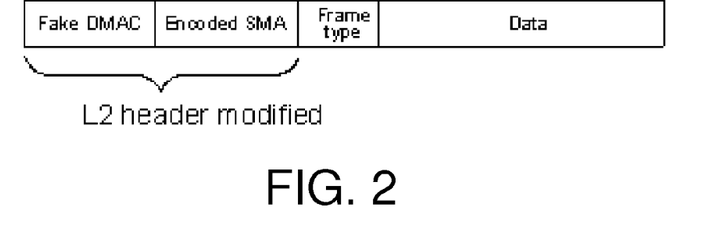
FIG. 2 shows the modified structure of a packet according to an embodiment of the present invention.

FIG. 2 shows the modified structure of a packet according to an embodiment of the present invention. As shown, compared with the original packet structure, only the packet header part is modified, wherein the original destination MAC address is modified into a fake MAC address of the next-hop middlebox, and the original source MAC address is modified into an encoded source MAC address, that is, the code word of the present invention.

Figure 3:
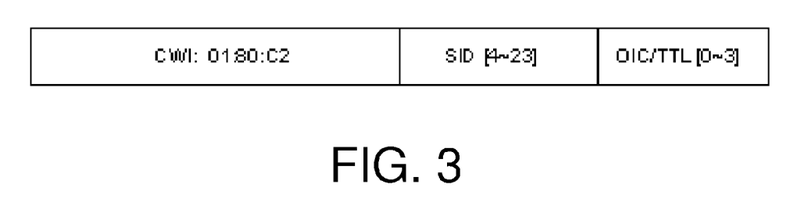
FIG. 3 shows an structure of the code word obtained by modifying the source MAC address according to an embodiment of the present invention.

FIG. 3 shows a structure of the code word obtained by modifying the source MAC address according to an embodiment of the present invention. As shown, the first 3 bytes of the code word (the 24th to 47th bits from the least significant end) is the code word indicator (01:80:C2 in this example), the 4th to the 23rd bits are the session ID, and the 0th to the 3rd bits are the current position of the packet in the service chain. Of course, the shown structure is merely an example, and other structures may alternatively be used to provide this functionality.

Figure 4:
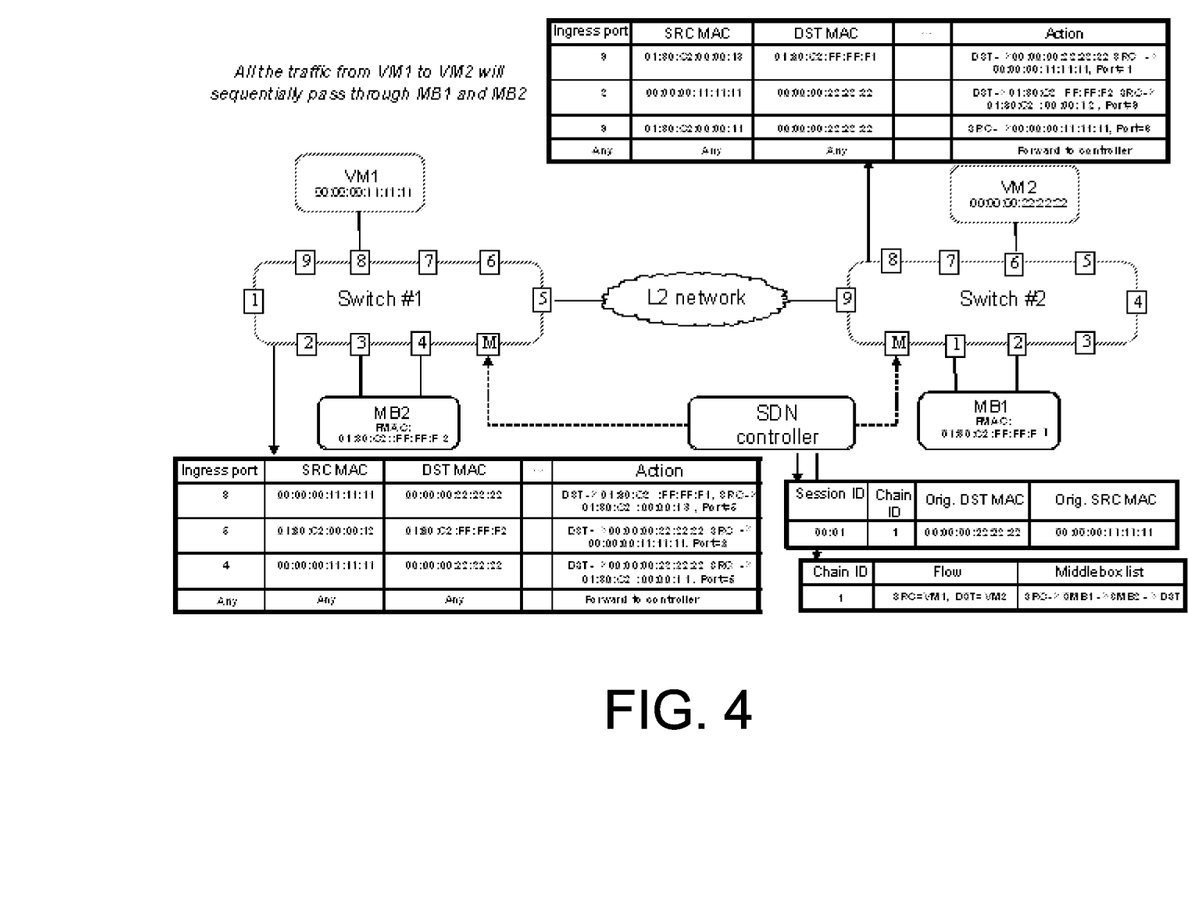
FIG. 4 shows an operation process with respect to an SDN network topology and an service chain of a method for realizing service chaining according to an embodiment of the present invention.

Now, referring to FIG. 4, it shows an operation process with respect to an SDN network topology and a service chain of a method for realizing service chaining according to an embodiment of the present invention. As shown, the schematic SDN network comprises switch #1 and switch #2 interconnected through a L2 network, a SDN controller connected with the switches via management ports M of the switches, host (virtual machine) VM1 (its MAC address is 00:00:00:11:11:11) connected to port 8 of switch #1, middlebox MB2 (its assigned fake MAC address is 01:80:C2:FF:FF:F2) connected to port 3 and port 4 of switch #1, host VM2 (its MAC address is 00:00:00:22:22:22) connected to port 6 of switch #2, and middlebox MB1 (its assigned fake MAC address is 01:80:C2:FF:FF:F1) connected to port 1 and port 2 of switch #2.

As shown in FIG. 4, there is a service chain table in the SDN controller, which lists the service chain ID, flow of the service chain (comprising the source and destination), and a list of middleboxes traversed by the service chain. As shown, the service chain table already contains an entry with the service chain ID of 1, flow of SRC=VM1, DST=VM 2 (that is, the source is VM 1 and the destination is VM2), and the middlebox list of SRC>MB1>MB2>DST, which indicates that for a flow with VM1 as the source and VM2 as the destination, the packet in the flow will sequentially pass through SRC, MB1, MB2, DST. The entry may be created in advance according to user's setting.

As shown in FIG. 4, there is further a session table in the SDN controller, which lists session ID, service chain ID, destination MAC address, and source MAC address. As shown, the session table contains an entry with the session ID of 00:01, service chain ID of 1, destination MAC address of 00:00:00:22:22:22 (that is, the MAC address of VM2), source MAC address of 00:00:00:11:11:11 (that is, the MAC address of VM1). The entry may be created by the SDN controller according to the information (for example, service chain ID, flow) in the service chain table when receiving the first packet in the flow from switch #1.

As shown in FIG. 4, switch #1 and switch #2 each have a forward table, and their entries may be called forward rules, which list the ingress port, source MAC address, destination MAC address of the packet, and the operation to be performed on the packet and the forward port of the packet. That is, for a packet received by the switch, if the ingress port, source MAC address and destination MAC address of the packet match some entry in the forward table, then the operation designated in the entry (that is, the modifying or restore operation performed on the packet header according to the present invention) will be performed on the source MAC address and the destination MAC address of the packet, and the packet will be forwarded through the forward port designated in the entry. The forward rules in the forward table of the switch may be created by the SDN controller when receiving the first packet in the flow from a switch and downloaded to the switch. That is, when the SDN controller receives the first packet in the flow from a switch (when the switch finds no matching forward rule in its forward table, it will send the packet to the SDN controller), it may create all the forward rules related to the packets in the traffic and download them to the respective switches. In addition, since forward rules in a switch may be swapped out or lost due to other reasons during the operation of the switch, the switch will also send a packet to the SDN controller when it cannot find a matching forward rule in its forward table for the packet (not the first packet in the flow), and in this case the SDN controller may create a forward rule for the packet and download it to the switch. The SDN controller may create the forward rules for the respective switches according to the destination MAC address and the source MAC address information in the session table, the middlebox list information in the service chain table and the SDN network topology information (including the connection relationships between the switches, middleboxes and hosts) it possesses, and download them to the respective switches.

Figure 5:
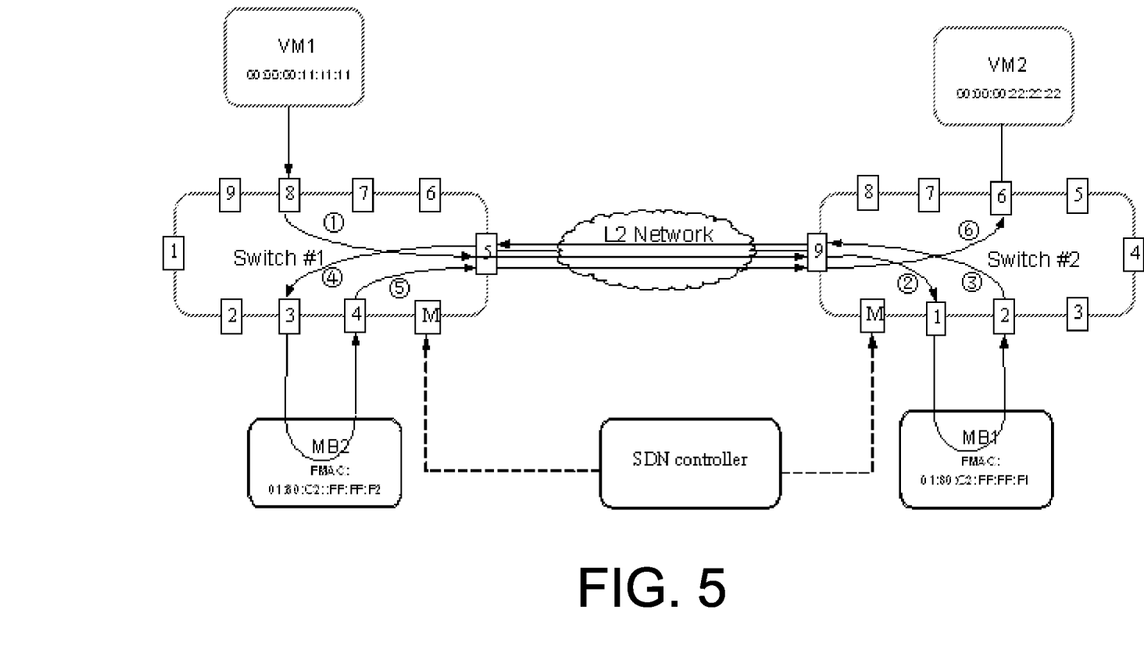
FIG. 5 shows the forwarding process of a packet with respect to the SDN network topology and service chain of FIG. 4 according to an embodiment of the present invention.

Further referring to FIG. 5, it shows the forwarding process of a packet with respect to the SDN network topology and service chain shown in FIG. 4 according to an embodiment of the present invention. As shown in FIG. 5 and in conjunction with FIG. 4, the forwarding process comprises the following steps:

In step 1, switch #1 receives a packet from host VM1 via its port 8, and the source MAC address in the header of the packet is 00:00:00:11:11:11, and the destination MAC address is 00:00:00:22:22:22. Switch #1 uses ingress port 8 and the source MAC address and destination MAC address to look up its forward table, and finds that the packet corresponds to the first entry in the forward table, and the operation designated in the entry is DST→01:80:C2:FF:FF: F1, SRC→01:80:C2:00:00:13, Port=5. According to the designated operation, switch #1 modifies the destination MAC address of the packet into 01:80:C2:FF:FF:F1, that is, the fake MAC address of middlebox MB1 in the next hop in the service chain, and modifies the source MAC address of the packet into code word 01:80:C2:00:00:13, wherein 01:80:C2 is the code word indicator, 00:00:1 is the session ID, and 3 denotes the current position of the packet in the service chain. Then, switch #1 transmits the packet out of port 5.

In step 2, switch #2 receives the packet from switch #1 via its port 9. Switch #2 uses the ingress port 9 of the packet, the source MAC address 01:80:C2:00:00:13 and the destination MAC address 01:80:C2:FF:FF:F1 in the packet header to find the matching first entry in the forward table, and the operation in the entry is DST→00:00:00:22:22:22 SRC→00:00:00:11:11:11, Port=1. According to the entry, switch #2 modifies the destination MAC address of the packet into 00:00:00:22:22:22, that is, restoring to the original destination MAC address, and modifies the source MAC address of the packet into 00:00:00:11:11:11, that is, restoring to the original source MAC address, and then transmits the packet out of port 1, that is, to middlebox MB1 for relevant processing.

In step 3, switch #2 receives the packet from middlebox MB1 via its port 2. Switch #2 uses ingress port 2 of the packet, the source MAC address 00:00:00:11:11:11 and the destination MAC address 00:00:00:22:22:22 in the packet header to find the matching second entry in the forward table, and the operation in the entry is DST→01:80:C2:FF: FF:F2 SRC→01:80:C2:00:00:12, Port=9. According to the operation designated in the entry, switch #2 modifies the destination MAC address of the packet into 01:80:C2:FF: FF:F2, that is, the fake MAC address of middlebox MB2 in the next hop in the service chain, and modifies the source MAC address of the packet into code word 01:80:C2:00: 00:12, wherein 01:80:C2 is the code word indicator, 00:00:1 is the session ID, and 2 denotes the current position of the packet in the service chain (position 2 has changed as compared with position 3 in step 1). Then switch #2 transmits the packet out of port 9.

In step 4, switch #1 receives the packet from switch #2 via its port 5. Switch #1 uses ingress port 5 of the packet, the source MAC address 01:80:C2:00:00:12 and the destination MAC address 01:80:C2:FF:FF:F2 in the packet header to find the matching second entry in its forward table, and the operation in the entry is DST→00:00:00:22:22:22 SRC→00:00:00:11:11:11, Port=3. According to the entry, switch #2 modifies the destination MAC address of the packet into 00:00:00:22:22:22 that is, restoring to the original destination MAC address, and modifies the source MAC address of the packet into 00:00:00:11:11:11, that is, restoring to the original source MAC address. Then it transmits the packet out of port 3, that is, to middlebox MB2 for relevant processing.

In step 5, switch #1 receives the packet from middlebox MB2 via its port 4. Switch #1 uses ingress port 4 of the packet, the source MAC address 00:00:00:11:11:11 and the destination MAC address 00:00:00:22:22:22 in the packet header to find the matching third entry in its forward table, and the operation in the entry is DST→00:00:00:22:22:22 SRC→01:80:C2:00:00:11, Port=5. According to the operation designated in the entry, switch #1 modifies the destination MAC address of the packet into 00:00:00:22:22:22 (actually not changing), that is, the MAC address of the destination host VM2 in the next hop in the service chain, and modifies the source MAC address of the packet into code word 01:80:C2:00:00:11, wherein 01:80:C2 is the code word indicator, 00:00:1 is the session ID, and 1 denotes the current position of the packet in the service chain (position 1 has changed as compared with position 2 in step 3). Then, switch #1 transmits the packet out of port 5.

In step 6, switch #2 receives the packet from switch #1 via its port 9. Switch #2 uses ingress port 9 of the packet, the source MAC address 01:80:C2:00:00:11 and the destination MAC address 00:00:00:22:22:22 in the packet header to find the matching third entry in its forward table, and the operation in the entry is SRC→00:00:00:11:11:11, Port=6. According to the entry, switch #2 modifies the source MAC address of the packet into 00:00:00:11:11:11, that is, restoring to the original source MAC address, and then transmits the packet out of port 6, that is, to destination host VM2, so as to complete the entire forwarding process.

As known by those skilled in the art, the packet forwarding process shown in FIG. 4 and FIG. 5 and described above is merely exemplary, rather than restriction to the present invention. Now referring to FIG. 6, it shows a flowchart of a method for realizing the service chain according to an embodiment of the present invention.

Figure 6:
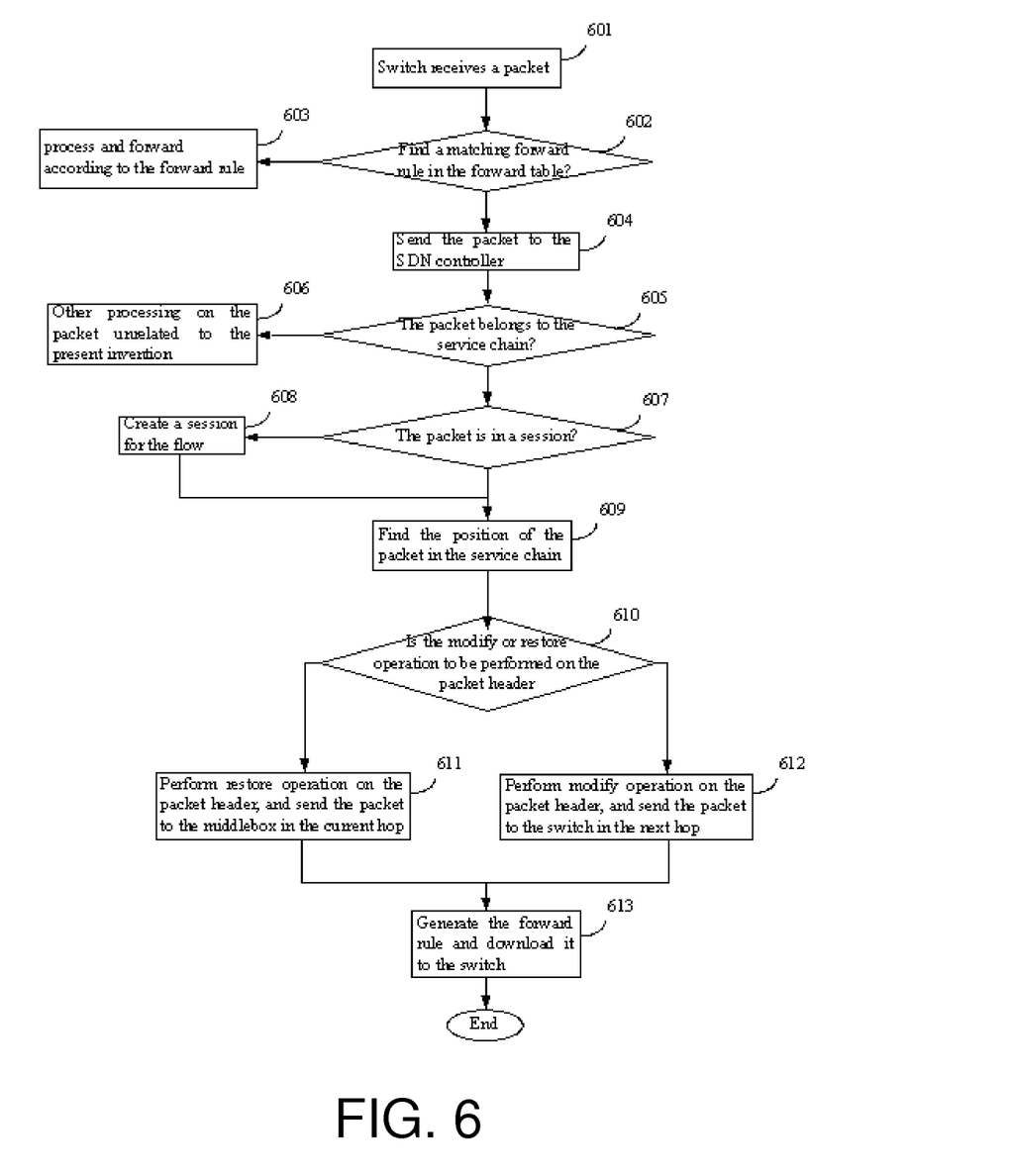
FIG. 6 shows a flowchart of a method for realizing service chaining according to an embodiment of the present invention.

As shown, in step 601, the switch receives a packet.

In step 602, the switch determines whether a matching forward rule can be found in the forward table of the switch according to the ingress port of the packet, and the source MAC address and the destination MAC address in the packet header. The forward table may have a structure similar to that shown in FIG. 4, with its entries (that is, forward rules) including the mapping between the ingress port, the source MAC address and the destination MAC address of the packet and the modify or restore operation to be performed on the source MAC address and the destination MAC address of the packet and the forward port of the packet.

If the determination in step 602 is yes, the process proceeds to step 603; if the determination in step 602 is no, the process proceeds to step 604.

In step 603, the switch processes and forward the packet according to the matching forward rule, that is, performing the modify or restore operation designated in the forward rule on the source MAC address and destination MAC address of the packet, and transmitting the packet out of the forward port designated in the forward rule.

In step 604, the switch transmits the packet to the SDN controller.

In step 605, the SDN controller determines whether the packet belongs to a service chain. The SDN controller may determine whether the packet belongs to a service chain according to the packet header.

If the SDN controller determines that the source MAC address in the packet header comprises the code word indicator according to an embodiment of the present invention (for example, in the example shown in FIG. 3, the first 24 bits are 01:80:C2), then the SDN controller may determine that the packet belongs to a service chain, and may extract the session ID from the source MAC address (that is, code word), and may use the session ID to obtain the ID of the service chain to which the packet belongs from the session table maintained by the SDN controller. As shown above in FIG. 4, the session table maintained by the SDN controller comprises the mapping between the session ID, the service chain ID, the original destination MAC address, and the original source MAC address.

If the SDN controller determines that the source MAC address in the packet header does not comprises the code word indicator according to an embodiment of the present invention (for example, in the example shown in FIG. 3, the first 24 bits are not 01:80:C2), that is, the source MAC address (and the destination MAC address) of the packet is an ordinary MAC address, and the SDN controller may match the source MAC address and the destination MAC address with the service chain table it maintains to find the service chain ID. As shown above in FIG. 4, the service chain table maintained by the SDN controller may comprise the service chain ID, the source device and destination device of the flow (the MAC address of the source device and the destination device, that is, the source MAC address and destination MAC address of the packets), and the middlebox list of the service chain. If the SDN controller finds a matching service chain ID in the service chain table, then it may determine that the packet belongs to the service chain; if the SDN controller finds no matching service chain ID in the service chain, then it may determine that the packet does not belong to a service chain.

If the determination of step 605 is no, the process proceeds to step 606; if the determination of step 605 is yes, the process proceeds to step 607.

In step 606, the SDN controller performs other processing on the packet unrelated to the present invention, for example, performing forwarding in the prior art (which is not described in detail here).

In step 607, the SDN controller determines whether the packet is in a session.

If the SDN controller has determined in step 605 that the source MAC address in the packet header comprises the code word indicator according to an embodiment of the present invention, then the SDN controller may determine that the packet is in a session (and the session ID has been extracted from the code word in step 605).

If the SDN controller has determined in step 605 that the source MAC address in the packet header does not comprise the code word indicator according to an embodiment of the present invention, that is, the source MAC address and the destination MAC address in the packet header are an ordinary source MAC address and an ordinary destination MAC address, then the SDN controller may use the session table (or a reverse session table) it maintains to find the matching session ID. As shown above in FIG. 4, the session table comprises the mapping between the session ID, the service chain ID, the original destination MAC address, and the original source MAC address. The reverse session table may comprise the mapping between the original destination MAC address, the original source MAC address and the session ID. If the SDN controller finds a matching session ID in the session table (or the reverse session table), then it may determine that the packet is in the session; if the SDN controller find no matching session ID in the session table (or the reverse session table), then it may determine that the packet is not in a session.

If the determination in step 607 is no, the process proceeds to step 608; if the determination in step 607 is yes, the process proceeds to step 609.

In step 608, the SDN controller creates a session for the flow to which the packet belongs, including creating a new entry in the session table comprising a session ID, the service chain ID, the original destination MAC address, the original source MAC address. Then, the process proceeds to step 609.

In step 609, the SDN controller finds the current position of the packet in the service chain. For the packet for which it has been determined in step 605 that the source MAC address in the packet header comprises the code word indicator according to an embodiment of the present invention, the SDN controller may directly obtain the current position of the packet in the service chain from the source MAC address (that is, the code word according to an embodiment of the present invention). And for the packet for which it has been determined in step 605 that the source MAC address in the packet header does not comprise the code word indicator according to an embodiment of the present invention, the SDN controller may first use the service chain ID of the packet to obtain the middlebox list of the service chain from the service chain table it maintains, and then determine from which middlebox the packet comes according to the ingress port in the switch of the packet and the connection relationships between the switches and the middleboxes maintained by the SDN controller, so as to get the current position of the service chain.

In step 610, the SDN controller determines whether a modify operation or restore operation is to be performed on the packet header.

If the SDN controller has determined in step 605 that the source MAC address in the packet header comprises the code word indicator according to an embodiment of the present invention, and determines that the current switch (that is, the switch from which the packet comes) is the switch in the next hop in the service chain, then the SDN controller determines that a restore operation is to be performed on the packet header, and the process proceeds to step 611.

If the SDN controller has determined in step 605 that the source MAC address in the packet header does not comprise the code word indicator according to an embodiment of the present invention, then the SDN controller determines that a modify operation is to be performed on the packet header, and the process proceeds to step 612.

In step 611, the SDN controller performs the restore operation on the packet header, that is, restoring the source MAC address (that is, the code word) of the packet to the original source MAC address, and restoring the destination MAC address (that is, the fake MAC address of the middlebox) of the packet to the original destination MAC address of the packet, and transmits the packet to the middlebox in the current hop (that is, the hop in which the packet is in the service chain). The SDN controller may extract the session ID from the code word, and use the session ID to obtain the original source MAC address and the original destination MAC address of the packet from the session table it maintains. The SDN controller may get the middlebox in the current hop according to the current position of the service in the service chain found in step 609, and the switch port to which the middlebox is connected, and send the packet to the middlebox. Then the process proceeds to step 613.

In step 612, the SDN controller performs the modify operation on the packet header, that is, modifying the source MAC address of the packet into the code word according to an embodiment of the present invention, and modifying the destination MAC address of the packet into the fake MAC address of the middlebox in the next hop, and transmits the packet to the switch in the next hop. The SDN controller may use the session ID found in step 607 or created in step 608 and the current position of the packet in the service chain to form the code word indicator, and may obtain the fake MAC address of the middlebox in the next hop from a middlebox table it maintains. The SDN controller may obtain the forward port of the packet in the current switch according to the current switch from which the packet comes, the middlebox in the next hop, and the connection topological relationships among switches and middleboxes, and forward the packet to the switch in the next hop. Then the process proceeds to step 613.

In step 613, the SDN controller generates a forward rule and downloads it to the switch. The SDN controller may form the forward rule according to the receive port, the source MAC address, the destination MAC address of the packet, and the restore or modify operation to be performed on the packet determined in step 611 or 612 and the forward port of the packet, and download it to the switch. In addition, according to an embodiment of the present invention, if in step 607 the SDN controller determines that the packet is not in a session and thus determines that the packet is the first packet in the flow, then the SDN controller may form all the forward rules required for the packet to pass through the service chain, and download them to the relevant switches. The SDN controller may determine the forward rules (including the mapping between the ingress port, the source MAC address, the destination MAC address, the modify or restore operation to be performed on the packet header and the forward port) required for the packet in the respective hops in the service chain according to the service chain, and the connection relationships among the respective middleboxes in the service chain and the switches, and send them to the respective switches. Then, the process ends. Thereafter, the switch may restart the above process on receiving a subsequent packet in the flow.

Above is described a flowchart of a method for realizing service chaining according to embodiments of the present invention by referring to the accompanying drawings. It should be pointed out that the numerous details included in the above description is merely explanation of the present invention, rather than restriction to the present invention. In other embodiments of the present invention, the method may have more, less or different steps, and the relationships of sequence, inclusion, function etc. among the steps may be different from that is described or illustrated.

In another aspect of the present invention, there is also provided an apparatus for realizing service chaining, which comprises: modifying means configured to, in response to receiving a packet belonging to a service chain and that the packet is to be sent to a switch in the next hop in the service chain, modify the original destination MAC address of the packet into a designated MAC address of the middlebox in the next hop in the service chain (for example, fake MAC address), and modify the original source MAC address of the packet into code data encoded with state information of the packet; and restoring means configured to, in response to that the packet is to be sent to the middlebox in the current hop in the service chain, restore the modified destination MAC address of the packet to the original destination MAC address of the packet, and restore the modified source MAC address of the packet to the original source MAC address of the packet.

According to an embodiment of the present invention, the state information of the packet comprises identification of the session to which the packet belongs and the position of the packet in the service chain.

According to the embodiment of the present invention, the code data further comprises a code data indicator.

In another aspect of the present invention, there is further provided an apparatus for realizing service chaining, which comprises: means configured to, in response to receiving a packet at a switch, look up a matching rule in a forward table according to the source MAC address, the destination MAC address and the receive port of the packet, wherein a rule in the forward table designates the mapping between the source MAC address, the destination MAC address and the receive port of the packet, and a modify or restore operation to be performed to the source MAC address and the destination MAC address of the packet and the forward port of the packet; means configured to, in response to finding a matching rule in the forward table, perform the modify or restore operation designated in the matching rule on the source MAC address and the destination MAC address of the packet, and forward the packet through the forward port designated in the matching rule, wherein the modify operation comprises: modifying the original destination MAC address of the packet into a designated MAC address of the middlebox in the next hop in the service chain, and modifying the original source MAC address of the packet into code data encoded with state information of the packet; and wherein the restore operation comprises: restoring the modified destination MAC address of the packet to the original destination MAC address of the packet, and restoring the modified source MAC address of the packet to the original source MAC address of the packet.

According to an embodiment of the present invention, the state information of the packet comprises identification of the session to which the packet belongs and the current position of the packet in the service chain, and the code data further comprises a code data indicator.

According to an embodiment of the present invention, the apparatus for realizing the service chain further comprises: means configured to, in response to finding no matching rule in the forward table, send the packet to a SDN controller; means configured to, at the SDN controller, determine the service chain and the session to which the packet belongs and the current position of the packet in the service chain according to the source MAC address and the destination MAC address of the packet, so as to determine the modify or restore operation to be performed on the source MAC address and the destination MAC address of the packet and the forward port of the packet, and form a rules comprising the mapping between the source MAC address, the destination MAC address, and the receive port of the packet, and the modify or restore operation to be performed on the source MAC address and the destination MAC address of the packet and the forward port; means configured to perform the determined modify or restore operation on the source MAC address and the destination MAC address of the packet, and forward the packet through the determined forward port; means configured to send the formed rule to the switch, to be stored by the switch in a forward table for use in processing and forwarding of subsequent packets.

According to an embodiment of the present invention, the means configured to, at the SDN controller, determine the service chain and the session to which the packet belongs and the current position of the packet in the service chain according to the source MAC address and the destination MAC address of the packet comprises: means configured to, in response to determining that the source MAC address of the packet comprises a code data indicator indicating that the source MAC address being the code data, obtain the identification of the session to which the packet belongs and the current position of the packet in the service chain from the code data, and obtain identification of the service chain to which the packet belongs from a session table maintained by the SDN controller according to the session identification; means configured to, in response to determining that the source MAC address of the packet does not comprise the code data indicator indicating that the source MAC address being code data, using the session table and a service chain table maintained by the SDN controller to determine the service chain and the session to which the packet belongs and the current position of the packet in the service chain, wherein the session table comprises the mapping between the session identification, the service chain identification, the original destination MAC address and the original source MAC address of the packet, and the service chain table comprises the mapping between the service chain identification and the middlebox list of the service chain.

According to an embodiment of the present invention, the determining the session to which the packet belongs at the SDN controller according to the source MAC address and the destination MAC address of the packet comprises: determining that the packet is the first packet in the flow and creating a session; the forming a rule comprising the mapping between the source MAC address, the destination MAC address and the receive port of the packet, and the modify or restore operation to be performed on the source MAC address and the destination MAC address of the packet and the forward port comprises: forming all the rules required for the packet to pass through the service chain; and sending the formed rule to the switch to be stored in the forward table for use in processing and forwarding of subsequent packets comprises: sending all the rules required for the packet to pass through the service chain to the respective switches to be stored by the switched in the respective forward tables for use in processing and forwarding of subsequent packets.

Figure 7:
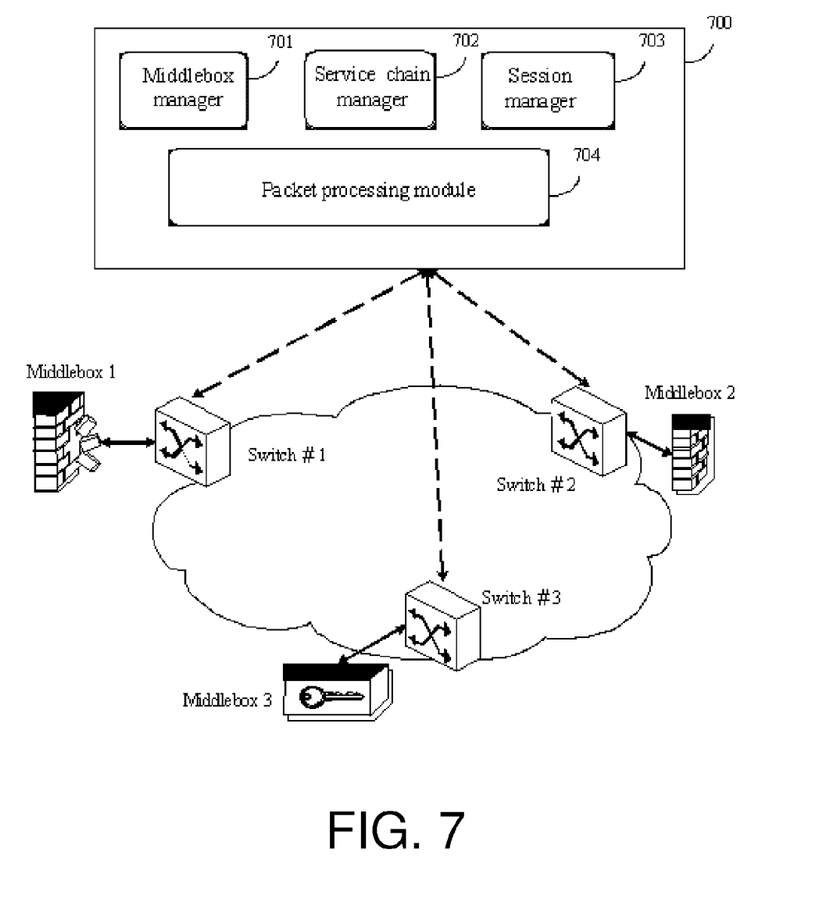
FIG. 7 shows a structural block diagram of a SDN controller and an architecture diagram of the SDN network where it operates according to an embodiment of the present invention.

In yet another aspect of the present invention, there is further provided an SDN controller. Now referring to FIG. 7, it shows a structural block diagram of a SDN controller according to an embodiment of the present invention and an architecture diagram of a SDN network where it operates. As shown in FIG. 7, the SDN network comprises three switches (switch #1, switch #2, and switch #3), and each switch is connected to a middlebox (middlebox 1, middlebox 2, and middlebox 3) respectively. The SDN controller 700 is connected to the three switches to control the three switches.

As shown in FIG. 7, SDN controller 700 includes the following modules: (i) a middlebox manager 701 configured to manage middleboxes and their fake MAC addresses; (ii) a service chain manager 702 configured to manage service chains by maintaining the serve chain table, and the service chain table comprises the mapping between service chain identification and the middlebox list of the service chain; (iii) a session manager 703 configured to manage sessions by maintaining a session table, the session table comprising the mapping between the session identification, the service chain identification, the original destination MAC address and the original source MAC address of a packet; (iv) a packet process module 704.

Packet process module 704 is configured to: (a) in response to receiving a packet from a switch, determine the service chain and the session to which the packet belongs and the current position of the packet in the service chain according to the source MAC address and the destination MAC address of the packet and the session table and the service chain table, so as to determine the modify or restore operation to be performed on the source MAC address and the destination MAC address of the packet and the forward port of the packet, and to form a rule comprising the mapping between the source MAC address, the destination MAC address and the receive port of the packet, and the modify or restore operation to be performed on the source MAC address and the destination MAC address of the packet and the forward port; (b) perform the determined modify or restore operation on the source MAC address and destination MAC address of the packet, and forward the packet through the determined forward port; (c) send the formed rule to the switch to be stored by the switch in a forward table, for use in processing and forwarding of subsequent packets. The modify operation includes the following steps: (1) modifying the original destination MAC address of the packet into a designated MAC address of the middlebox in the next hop in the service chain, and (2) modifying the original source MAC address of the packet into code data encoded with state information of the packet. The restore operation includes: (1) restoring the modified destination MAC address of the packet to the original destination MAC address of the packet, and (2) restoring the source MAC address of the packet to the original source MAC address of the packet.

According to an embodiment of the present invention, the determination of the session to which the packet belongs is made according to the source MAC address and the destination MAC address of the packet and the session table and the service chain table. This determination includes the following sub-steps: (i) determining that the packet is the first packet in the flow, and creating a session; (ii) forming a rule comprising the mapping between the source MAC address, the destination MAC address, the receive port of the packet and (iii) a modify or restore operation to be performed on the source MAC address and the destination MAC address of the packet. The forward table facilitates performance of the following steps: (i) forming all the rules required for the packet to pass through the service chain; (ii) sending the formed rule to the switch to be stored by the switch in the forward table for use in processing and forwarding of subsequent packets; and (iii) sending all the rules required for the packet to pass through the service chain to the respective switches to be stored by the switches in the respective forward tables for use in processing and forwarding of subsequent packet.

Above is described an SDN controller according to an embodiment of the present invention by referring to the accompanying drawings. In other embodiments of the present invention, the SDN controller may have more, less or different modules, and the relationships of connection, inclusion and function, etc., among the modules may be different from that is described and illustrated.

Advantages of the technical solution according to embodiments of the present invention may include one, or more, of the following: (i) the traffic seen by the hosts and the middleboxes will keep the original format without changes, therefore service provision will be transparent to both tenants and the middleboxes, thus not affecting the existing network forwarding; (ii) the forward rules on the switches will be generated by the SDN controller, without need to change the hardware of the switches, and thus the deployment of the service chain will be easy and flexible;

(iii) the SDN controller may be well integrated to the existing network infrastructure, and it may even work with the non-SDN switches; (iv) in addition, forward rules may be dynamically updated by the SDN controller; (v) the service chain is easy to manage; and/or (v) flexible performance and security support.

Figure 8:
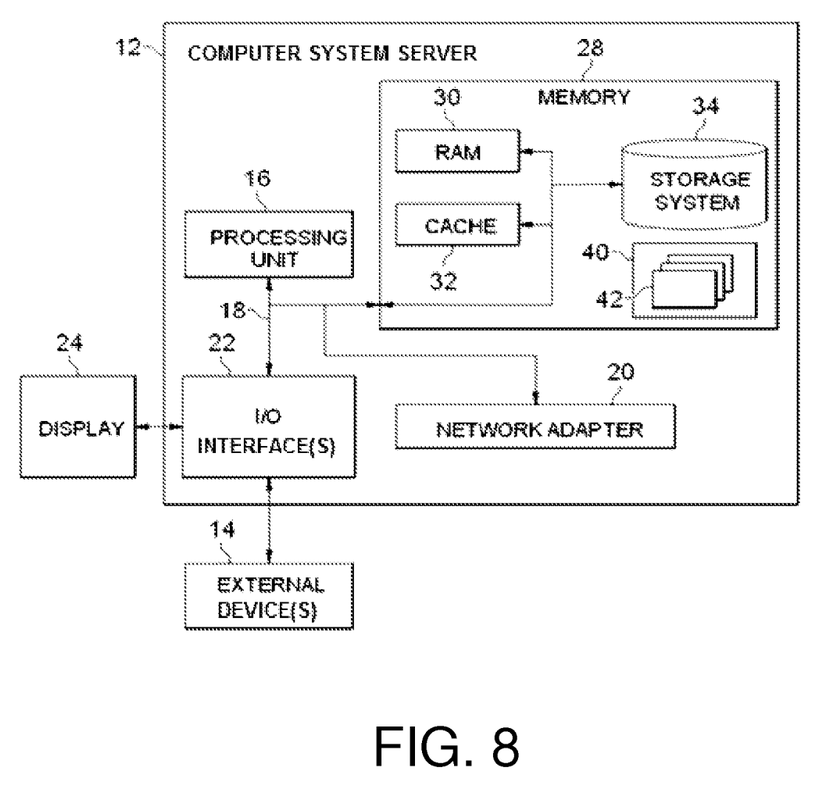
FIG. 8 shows a block diagram of a computer system/server which is applicable to implement the embodiments of the present invention.

Referring now to FIG. 8, in which a computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 8, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically comprises a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:
1. A method comprising:
receiving a packet belonging to a service chain, which packet: (i) includes an original destination MAC (media access control) address, (ii) includes an original source MAC address, and (iii) is to be sent to a switch in a next hop, including a middlebox, in the service chain;
in response to receipt of the packet, modifying the original destination MAC address of the packet into a modified destination MAC address corresponding to the middlebox in the next hop in the service chain;
in response to receipt of the packet, modifying the original source MAC address of the packet into a modified source MAC address corresponding to code data encoded with state information of the packet;
sending the packet to the middlebox in the next hop in the service chain;
receiving the packet at the next hop in the service chain so that the next hop becomes a current hop in the service chain;
in response to receipt of the packet at the current hop of the service chain, restoring the modified destination MAC address of the packet to the original destination MAC address of the packet; and
in response to receipt of the packet at the current hop of the service chain, restoring the modified source MAC address of the packet to the original source MAC address of the packet
wherein:
the state information of the packet, encoded into the code data, includes identification of a session to which the packet belongs and a current position of the packet in the service chain; and
the code data further includes a code data indicator.

2. An apparatus comprising:
a first module configured to, in response to receiving a packet at a switch, look up a matching rule in a forward table according to the source MAC (media access control) address, the destination MAC address and the receive port of the packet, with each rule in the forward table designating: (i) a mapping between the source MAC address, the destination MAC address and the receive port of the packet, (ii) a modify operation to be performed on the source MAC address and the destination MAC address of the packet, (iii) a restore operation to be performed on the source MAC address and the destination MAC address of the packet, and (iv) a forward port of the packet;
a second module configured to, in response to finding the matching rule in the forward table, perform the modify/restore operation designated in the matching rule on the source MAC address and destination MAC address of the packet; and
a third module configured to forward the packet through the forward port designated in the matching rule;
wherein:
the modify operation includes the following sub-operations: modifying the original destination MAC address of the packet into a modified destination MAC address of the middlebox in the next hop in the service chain, and modifying the original source MAC address of the packet into a modified source MAC address corresponding to code data encoded in the state information of the packet; and
the restore operation includes the following sub-operations: restoring the modified destination MAC address of the packet to the original destination MAC address of the packet, and restoring the modified source MAC address of the packet to the original source MAC address of the packet;

wherein:
the state information of the packet includes identification of the session to which the packet belongs and the current position of the packet in the service chain; and
the code data further includes a code data indicator.

3. The apparatus of claim 2, further comprising:
a fourth module configured to, in response to finding no matching rule in the forward table, send the packet to a SDN controller;
a fifth module configured to, at the SDN controller, determine the service chain and the session to which the packet belongs and the current position of the packet in the service chain according to the source MAC address and the destination MAC address of the packet, so as to:
determine the modify or restore operation to be performed on the source MAC address and the destination MAC address of the packet and the forward port of the packet, and
form a rule including the mapping between the source MAC address, the destination MAC address and the receive port of the packet, and the modify or restore operation to be performed on the source MAC address and the destination MAC address of the packet and the forward port;
a sixth module configured to perform the determined modify or restore operation on the source MAC address and the destination MAC address of the packet, and to forward the packet through the determined forward port; and
a seventh module configured to send the formed rule to the switch to be stored by the switch in the forward table for use in processing and forwarding of subsequent packets.

4. The apparatus of claim 3, wherein:
the fifth module includes:
an eighth module configured to determine that the source MAC address of the packet comprises a code data indicator indicating the source MAC address being code data, and in response to determining that the source MAC address of the packet comprises the code data indicator indicating the source MAC address being code data, obtain identification of the session to which the packet belongs and the current position of the packet in the service chain from the code data, and obtain identification of the service chain to which the packet belongs from a session table maintained by the SDN controller according to the identification of the session, and
a ninth module configured to determine that the source MAC address of the packet does not comprise the code data indicator indicating the source MAC address being code data, and in response to determining that the source MAC address of the packet does not comprise the code data indicator indicating the source MAC address being code data, use the session table and a service chain table maintained in the SDN controller to determine the service chain and the session to which the packet belongs and the current position of the packet in the service chain;
wherein:
the session table includes the mapping between the session identification, the service chain identification, the original destination MAC address, and the original source MAC address of the packet; and the service chain table includes the mapping between service chain identification and the middlebox list of the service chain.

5. The apparatus of claim 4, wherein:
the determination of the session to which the packet belongs at the SDN controller according to the source MAC address and destination MAC address of the packet includes determining that the packet is the first packet in the flow and creating a session;
the formation of a rule including the mapping between the source MAC address, the destination MAC address, the receive port of the packet, and the modify or restore operation to be performed to the source MAC address and the destination MAC address of the packet and the forward port includes forming all the rules required for the packet to pass through the service chain; and
the sending the formed rule to the switch includes sending all the rules required for the packet to pass through the service chain to the respective switches to be stored by the switches in the respective forward tables for use in processing and forwarding of subsequent packets.

6. An SDN (Software Defined Network) controller comprising:
a middlebox manager configured to manage middleboxes and fake MAC (media access control) addresses of the middleboxes;
a service chain manager configured to manage service chains by maintaining a service chain table, the service chain table including the mapping between service chain identification and a middlebox list of the service chain;
a session manager configured to manage sessions by maintaining a session table, the session table including the mapping between the session identification, the service chain identification, the original destination MAC address and the original source MAC address of a packet;
a packet processing module configured to receive a packet from a switch, and in response to receiving the packet from the switch:
  determine the service chain and the session to which the packet belongs and the current position of the packet in the service chain according to the source MAC address and the destination MAC address of the packet and the session table and the service chain table, so as to determine any modify operation and/or any restore operation to be performed on the source MAC address and the destination MAC address of the packet and the forward port of the packet,
  form a rule comprising the mapping between the source MAC address, the destination MAC address, the receive port of the packet, and the modify or restore operation to be performed on the source MAC address and the destination MAC address of the packet and the forward port,
  perform the determined modify and/or restore operation on the source MAC address and the destination MAC address of the packet, and forward the packet through the determined forward port, and
  send the formed rule to the switch to be stored by the switch in a forward table for use in processing and forwarding of subsequent packets; wherein:
the modify operation includes the following sub-operations: (i) modifying the original destination MAC address of the packet into a designated MAC address of the middlebox in the next hop in the service chain, and (ii) modifying the original source MAC address of the packet into code data encoded with state information of the packet; and
the restore operation includes the following sub-operations: (i) restoring the modified destination MAC address of the packet to the original destination MAC address of the packet, and (ii) restoring the source MAC address of the packet to the original source MAC address of the packet.

7. The SDN controller of claim 6 wherein:
the determination of the session to which the packet belongs includes: (i) determining that the packet is the first packet in the flow, and (ii) creating a session;
the formation of a rule comprising the mapping between the source MAC address, the destination MAC address, the receive port of the packet, and the modify or restore operation to be performed on the source MAC address and the destination MAC address of the packet and the forward port includes forming all the rules required for the packet to pass through the service chain; and
the sending the formed rule to the switch includes sending all the rules required for the packet to pass through the service chain to the respective switches to be stored by the switches in the respective forward tables for use in processing and forwarding of subsequent packets.

* * * * *